United States Patent
Shukla et al.

(10) Patent No.: US 8,862,182 B2
(45) Date of Patent: Oct. 14, 2014

(54) COUPLING REDUCTION FOR ELECTROMECHANICAL ACTUATOR

(75) Inventors: Ashutosh Y. Shukla, Santa Clara, CA (US); David A. Pakula, San Francisco, CA (US); Sawyer I. Cohen, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 13/602,009

(22) Filed: Aug. 31, 2012

(65) Prior Publication Data

US 2014/0066122 A1    Mar. 6, 2014

(51) Int. Cl.
*H04M 1/00* (2006.01)

(52) U.S. Cl.
USPC .............. 455/556.1; 340/439; 83/397; 701/1; 701/36; 348/14.08; 348/208.11; 348/340; 345/8; 345/419; 345/589; 345/633

(58) Field of Classification Search
CPC ............... B60R 16/0236; F16H 63/42; H04M 1/72522; H04M 1/72527; H04M 1/7253
USPC ......... 713/200; 701/1, 36; 359/630, 694, 824; 83/397; 348/14.08, 208.11, 340; 345/8, 345/589, 633; 340/439; 455/556.1
See application file for complete search history.

(56) References Cited

U.S. PATENT DOCUMENTS

| | | | |
|---|---|---|---|
| 3,606,296 A | 9/1971 | Chassagne |
| 4,278,726 A | 7/1981 | Wieme |
| 4,849,580 A | 7/1989 | Reuter |
| 5,182,158 A | 1/1993 | Schaeffer |
| 5,349,893 A | 9/1994 | Dunn |
| 5,368,914 A | 11/1994 | Barrett |
| 5,426,562 A | 6/1995 | Morehouse et al. |
| 5,587,854 A | 12/1996 | Sato et al. |
| 5,606,341 A | 2/1997 | Aguilera |
| 5,659,376 A | 8/1997 | Uehara et al. |
| 5,666,261 A | 9/1997 | Aguilera |
| 5,783,297 A | 7/1998 | Wise et al. |
| 5,936,600 A | 8/1999 | Ohashi et al. |
| 5,965,249 A | 10/1999 | Sutton et al. |
| 5,982,617 A | 11/1999 | Haley et al. |
| 6,154,360 A | 11/2000 | Kaczeus et al. |
| 6,262,888 B1 | 7/2001 | Siedow et al. |
| 6,288,489 B1 | 9/2001 | Isohata et al. |
| 6,324,054 B1 | 11/2001 | Chee et al. |
| 6,373,702 B2 | 4/2002 | Oishi et al. |
| 6,524,692 B1 | 2/2003 | Rosen |
| 6,596,976 B2 | 7/2003 | Lin et al. |

(Continued)

FOREIGN PATENT DOCUMENTS

| | | |
|---|---|---|
| CN | 202444711 | 9/2012 |
| CN | 203119975 | 8/2013 |

(Continued)

*Primary Examiner* — William D Cumming
(74) *Attorney, Agent, or Firm* — Brownstein Hyatt Farber Schreck, LLP (57) ABSTRACT

A portable electronic device comprises an electromechanical module having an actuator for positioning a mechanical element between first and second positions, and a controller coupled to the electromechanical module. The controller is configured to detect a mechanical event coupling to the electromechanical module, select an actuation signal to position the mechanical element in a safe position between the first and second positions, and transmit the selected signal, such that the mechanical element is positioned in the safe position during the event.

20 Claims, 5 Drawing Sheets

(56) References Cited

U.S. PATENT DOCUMENTS

| | | |
|---|---|---|
| 6,603,620 B1 | 8/2003 | Berding |
| 6,627,818 B2 | 9/2003 | Kamel et al. |
| 6,633,481 B2 | 10/2003 | Pavol |
| 6,647,328 B2 * | 11/2003 | Walker .................. 701/36 |
| 6,664,491 B2 | 12/2003 | Yanai et al. |
| 6,665,192 B2 | 12/2003 | Wimberger Friedl et al. |
| 6,744,186 B2 | 6/2004 | Oishi et al. |
| 6,809,916 B2 | 10/2004 | Nakata et al. |
| 6,859,357 B2 | 2/2005 | Morimoto et al. |
| 6,924,996 B2 | 8/2005 | Sugawara |
| 6,968,954 B2 | 11/2005 | Hsieh |
| 7,009,835 B2 | 3/2006 | Desai et al. |
| 7,059,182 B1 | 6/2006 | Ragner |
| 7,094,094 B2 | 8/2006 | Zahnen et al. |
| 7,113,351 B2 * | 9/2006 | Hovanky ................ 359/824 |
| 7,133,281 B2 | 11/2006 | Bae |
| 7,167,360 B2 | 1/2007 | Inoue et al. |
| 7,260,885 B2 | 8/2007 | Albrecht et al. |
| 7,369,345 B1 | 5/2008 | Li et al. |
| 7,382,567 B2 | 6/2008 | Liao et al. |
| 7,393,575 B2 | 7/2008 | Boss |
| 7,450,332 B2 | 11/2008 | Pasolini et al. |
| 7,463,436 B2 | 12/2008 | Takahashi et al. |
| 7,477,469 B2 | 1/2009 | Cook et al. |
| 7,492,544 B2 | 2/2009 | Jeansonne et al. |
| 7,532,478 B2 | 5/2009 | Jeong |
| 7,554,798 B2 | 6/2009 | Tanokuchi et al. |
| 7,568,942 B1 | 8/2009 | Lannon et al. |
| 7,612,994 B2 | 11/2009 | Ulrich et al. |
| 7,619,891 B2 | 11/2009 | Woo et al. |
| 7,643,243 B2 | 1/2010 | Lee et al. |
| 7,652,892 B2 | 1/2010 | Shiu et al. |
| 7,660,107 B2 | 2/2010 | Leung |
| 7,684,183 B2 | 3/2010 | Mori et al. |
| 7,760,289 B2 | 7/2010 | Nakanishi et al. |
| 7,817,373 B2 | 10/2010 | Choi et al. |
| 7,839,051 B2 | 11/2010 | Klinghult |
| 7,855,892 B2 | 12/2010 | Lin |
| 8,075,981 B2 | 12/2011 | Pearce et al. |
| 8,093,811 B2 | 1/2012 | Tanokuchi et al. |
| 8,106,789 B2 | 1/2012 | Yang et al. |
| 8,144,453 B2 | 3/2012 | Brown et al. |
| 8,189,280 B2 | 5/2012 | Ollila et al. |
| 8,190,015 B2 | 5/2012 | Li et al. |
| 8,248,777 B2 | 8/2012 | Prest |
| 8,289,689 B2 | 10/2012 | Chen et al. |
| 8,289,715 B2 | 10/2012 | Takahara |
| 8,305,744 B2 | 11/2012 | Shedletsky et al. |
| 8,330,305 B2 | 12/2012 | Hart et al. |
| 8,352,077 B2 | 1/2013 | Goswami et al. |
| 8,411,432 B1 | 4/2013 | Zimlin et al. |
| 8,446,475 B2 * | 5/2013 | Topliss et al. ............ 348/208.11 |
| 8,467,133 B2 * | 6/2013 | Miller ..................... 359/630 |
| 8,564,424 B2 * | 10/2013 | Evarts et al. ............ 340/439 |
| 2001/0056544 A1 * | 12/2001 | Walker ..................... 713/200 |
| 2004/0049324 A1 * | 3/2004 | Walker ..................... 701/1 |
| 2004/0174614 A1 * | 9/2004 | Hovanky ................... 359/694 |
| 2004/0226424 A1 * | 11/2004 | O'Banion et al. ........ 83/397 |
| 2005/0017396 A1 | 1/2005 | Pearce et al. |
| 2006/0109581 A1 | 5/2006 | Lee et al. |
| 2008/0024972 A1 | 1/2008 | Yamaguchi |
| 2008/0091309 A1 * | 4/2008 | Walker ..................... 701/1 |
| 2008/0192124 A1 | 8/2008 | Nagasaki |
| 2009/0273480 A1 | 11/2009 | Mittleman et al. |
| 2010/0060776 A1 * | 3/2010 | Topliss et al. ............ 348/340 |
| 2010/0149073 A1 * | 6/2010 | Chaum et al. ............ 345/8 |
| 2010/0162835 A1 | 7/2010 | Lee et al. |
| 2010/0164152 A1 | 7/2010 | Li |
| 2010/0272969 A1 | 10/2010 | Taylor |
| 2011/0228460 A1 | 9/2011 | Kim et al. |
| 2011/0257765 A1 | 10/2011 | Evans et al. |
| 2011/0310500 A1 | 12/2011 | Osaka et al. |
| 2012/0212484 A1 * | 8/2012 | Haddick et al. .......... 345/419 |
| 2012/0212499 A1 * | 8/2012 | Haddick et al. .......... 345/589 |
| 2012/0218301 A1 * | 8/2012 | Miller ..................... 345/633 |
| 2013/0063885 A1 | 3/2013 | Shedletsky et al. |
| 2013/0073095 A1 | 3/2013 | King et al. |
| 2013/0077278 A1 | 3/2013 | Prest |
| 2013/0100591 A1 | 4/2013 | Montevirgen et al. |
| 2013/0127980 A1 * | 5/2013 | Haddick et al. .......... 348/14.08 |
| 2013/0257582 A1 | 10/2013 | Rothkopf et al. |
| 2013/0278631 A1 * | 10/2013 | Border et al. ............ 345/633 |
| 2013/0285490 A1 | 10/2013 | Rothkopf et al. |

FOREIGN PATENT DOCUMENTS

| | | |
|---|---|---|
| GB | 1133198 | 11/1968 |
| JP | 2008067160 | 3/2008 |
| JP | 2009104407 | 5/2009 |
| JP | 2011099758 | 5/2011 |
| WO | WO2010/135421 | 11/2010 |

* cited by examiner

COUPLING REDUCTION FOR ELECTROMECHANICAL ACTUATOR

TECHNICAL FIELD

This disclosure relates generally to portable electronic devices, and specifically to portable devices equipped with a voice coil actuator. In particular, the disclosure relates to portable electronic devices with a focusing camera or other voice coil actuated component.

BACKGROUND

Portable electronic devices have experienced consistently increasing popularity, with correspondingly expanded versatility and functionality including combined voice, text, email, and internet communications, gaming applications, audio and video media capability, and imaging, navigation, scheduling, and voice recognition features. To accommodate this broad range of functionality, cameras and other on-board devices are designed for precise mechanical positioning, as accomplished via a range of electromechanical devices including voice coil motor (VCM) actuators.

To provide photographic, video capture and other imaging functions, for example, a digital camera assembly or other electronic imaging system may be provided. Typically, a photodetector or other light collecting element is utilized, such as CCD (charge-coupled device) or CMOS (complementary metal oxide semiconductor) array, in combination with a lens system for focusing images onto the photosensitive surface.

For improved focal range and image quality, a voice coil actuator or other electromechanical element may be provided to position the lens with respect to the focal plane. Where active positioning is used in a portable device, however, a range of engineering challenges must be addressed, including the need for lightweight devices with a small size envelope, in combination with improved durability and resistance to vibration, shock, and other mechanical effects.

SUMMARY

Exemplary embodiments of the present disclosure include a portable electronic device having an electromechanical module with an actuator for positioning a mechanical element between first and second positions. A controller may be coupled to the electromechanical module, and configured to detect a mechanical event coupling to the electromechanical module, select an actuator signal to position the mechanical element in a safe position, and transmit the selected signal, so that the mechanical element is positioned in the safe position during the event.

In various configuration, the portable electronic device may include a haptic device coupled to the controller for generating the mechanical event as a vibration signal. The electromechanical module may take the form of a camera having a voice coil actuator for positioning a lens carrier element between infinity and macro focus positions, and the controller may be configured to transmit the actuator signal to position the lens carrier element between these focus positions while the vibration signal is generated.

In additional configurations, the portable electronic device may include an accelerometer for detecting acceleration of the device. The controller may be configured to detect the mechanical event based on the acceleration being over a threshold determined by the mass of and biasing force on the mechanical element, or based on a free fall indicator. The controller may also be configured to select the actuator signal based on a direction of the acceleration, as compared to an axis of the actuator.

In further configurations, a mobile phone may comprise the portable electronic device, where the electromechanical module takes the form of a camera with a voice coil actuator for positioning a lens carrier between first and second focus positions. The mobile phone may include a vibration motor for generating the mechanical event as a vibration signal, and the controller may generate a visual signal in lieu of the vibration signal when the camera is actively controlled.

In additional exemplary embodiments, coupling effects in a portable electronic device may be reduced by detecting a mechanical event coupling to a lens carrier of a camera module, selecting an actuator signal to position the lens carrier in a safe position between first and second focus positions, and transmitting the selected actuator signal to the camera module. The lens carrier is positioned in the safe position to reduce the mechanical coupling effects.

In various applications, the mechanical event may be generated as a haptic signal by operation of a vibration motor, or as an audio signal generated by a speaker. In addition, the event may be detected based on an acceleration signal from an accelerometer, where the acceleration signal exceeds a threshold based on a spring bias force acting on the lens carrier. The portable electronic device may also be calibrated to select the actuator signal based on a minimum mechanical coupling signal range, and the mechanical event may be generated by operation of a vibration motor to determine the minimum range.

In further exemplary embodiments, a mobile device may include a vibration motor for generating vibration signals, a camera module with a voice coil actuator for positioning a lens carrier between first and second focus positions, and a controller coupled to the vibration motor and camera module. The controller can be configured to select an actuator signal for positioning the lens carrier in a safe position between the first and second focus positions, such that mechanical coupling effects are reduced during operation of the vibration motor.

In various aspects, the mobile device may include an accelerometer coupled to the controller to sense acceleration. The controller can be configured to select the actuator signal based on the acceleration being over a threshold determined by a spring bias force on the lens carrier, or based on a direction of the acceleration with respect to an axis of the voice coil actuator. In addition, each of the various features of the above embodiments, aspects and applications may also be combined in various additional forms, without departing from the scope of the disclosure and the spirit of the invention as claimed.

DETAILED DESCRIPTION

Figure 1:
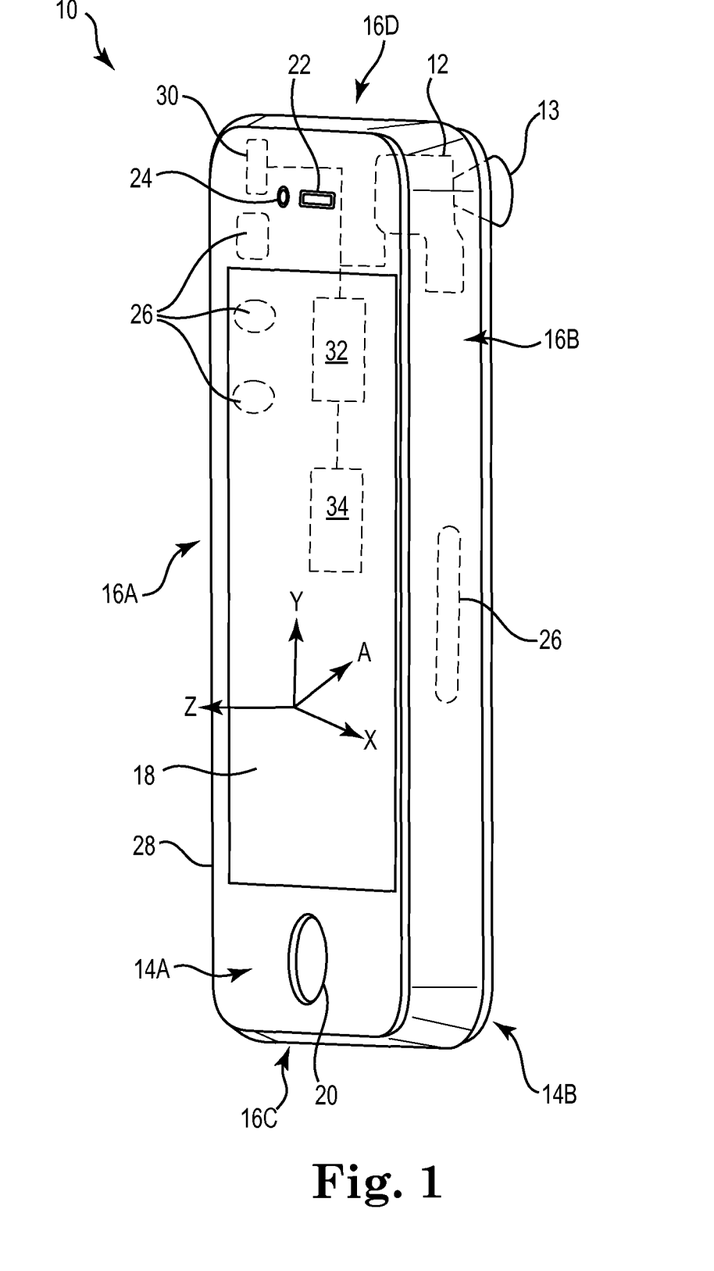
FIG. 1 is a schematic view of a mobile device with an electromechanically actuated component, in a cellular phone embodiment with a voice coil actuated camera.

FIG. 1 is a schematic view of portable electronic device 10, such as a mobile device, with a voice coil actuated electromechanical component 12. In the particular embodiment of FIG. 1, for example, device 10 may comprise or be comprised within a cellular phone, smartphone or other personal digital device, such as a portable media player, laptop computer, digital camera or tablet computer. Electromechanical component 12 (indicated by dashed lines, and generally not visible, or only partially visible, from outside the device 10) typically takes the form of a digital imaging device, for example a camera module with a voice coil actuated lens assembly for controlling field of view 13.

Mobile device 10 is provided with safe positioning technology to reduce mechanical coupling effects on the camera or other electromechanical component 12 during shock and vibration events, as described below. Alternatively, portable device 10 may be affixed to a mount or other stationary structure, or provided in a substantially stationary embodiment, with similar protection from shock and vibration.

As shown in FIG. 1, mobile device 10 includes a first major (e.g., front) surface 14A and a second major (e.g., back) surface 14B that is positioned opposite first major surface 14A. Sides 16A, 16B, 16C and 16D extend between front and back surfaces 14A and 14B. Taken together, these sides and surfaces may define an enclosure of the electronic device 10. The enclosure may at least partially surround the camera module 12 and other internal elements.

In this particular example, front surface 14A is provided with a display interface 18 and control feature 20, for example a touch screen and home button. Back surface 14B is provided with a digital camera module or other electromechanical device 12, with safe positioning to reduce mechanical shock and vibration couplings. It should be appreciated that the electromechanical device 12 may be positioned on, adjacent or otherwise associated with any other surface or side of the device 10. Further, there may be multiple electromechanical devices 12 in any single electronic device 10.

In some designs, front or back surface 14A or 14B may also be provided with additional features such as speaker 22 and auxiliary camera module 24, for example a fixed-focus camera for video calling or teleconferencing. Alternatively, auxiliary camera module 24 can also be provided with a voice coil motor or analogous electromechanical actuator, with additional safe positioning control for reduced mechanical coupling effects in the event of vibrations or shock.

Coordinate axes X, Y, and Z, as shown on FIG. 1, provide a local reference system for mobile device 10, in an orthogonal configuration with the positive x axis defined in the direction from first (e.g., left) side 16A toward second (e.g., right) side 16B, positive y axis defined in the direction from third (e.g., bottom) side 16C toward fourth (e.g., top) side 16D, and positive z axis defined in a direction from second (e.g., back) surface 14B toward and extending outward from first (e.g., front) surface 14B, as shown in FIG. 1. In general, however, the coordinate system designations may be considered arbitrary, and front and back surfaces 14A and 14B may be reversed without loss of generality, along with any of side, top and bottom surfaces 16A, 16B, 16C, and 16D. The direction of (net) acceleration vector A is also arbitrary with respect to coordinate axes X, Y and Z, depending on the orientation of the local gravitational field, and the relative motion and rotational position and of mobile device 10.

Additional control, user interface and audio or visual features 26 may be distributed over surfaces 14A, 14B and sides 16A-16D of device 10, including, but not limited to: headphone jacks, dock connectors and other coupling elements for audiovisual connections, power input, and digital communications; microphone and speaker elements for telecommunications, multimedia playback and other audio functions; hold and volume buttons, ringer switches, and similar control features; access ports for auxiliary memory devices such as SIM (subscriber identity module) cards and memory cards; antenna elements for improved wireless communications; a camera flash unit, and logos and other design features. In some embodiments, device 10 may also be provided with a protective covering or case 28 along one or more of surfaces 14A, 14B and sides 16A-16D, for example with access ports or openings for selected control, user interface and audio or visual features 26.

In operation of mobile device 10, a number of features may be in simultaneous use. For example, telecommunications features and/or user applications may be used in combination with a digital camera module or other electromechanically actuated component 12. This may introduce mechanical interference in the operation of certain elements and/or components. As one example, e.g., when vibration motor module 30 is utilized to signal an incoming call or other signal, for example using an eccentric motor drive or other haptic signal generator, the resulting vibration may jostle, jar, vibrate or otherwise physically impact the electromechanically actuated component 12.

Continuing the example, operation of vibration motor 30 may generate a mechanical coupling to various components of the camera or other electromechanical component 12, for example causing rattling of the voice coil actuator and lens assembly. Vibrations, shaking, and mechanical shocks can also generate mechanical coupling effects in a deactivated or power-down state of component 12, for example by causing the actuator assembly to rattle against a stop or other structural component, as described below.

To address these considerations, device 10 is provided with actuator control system 32 to place the camera module or other electromechanical component 12 in a safe mode or safe position during shock and vibration events, in order to reduce rattling, wear, and other mechanical coupling effects. In particular, control system 32 is connected to vibration motor (or vibe motor controller) 30 and accelerometer 34, in order to provide an actuator control signal for positioning the actuated components in a safe or reduced coupling position when device 10 experiences vibrations and shocks. Control system 32 may also be configured to preposition electromechanical component 12 prior to such events, as described below.

Figure 2A:
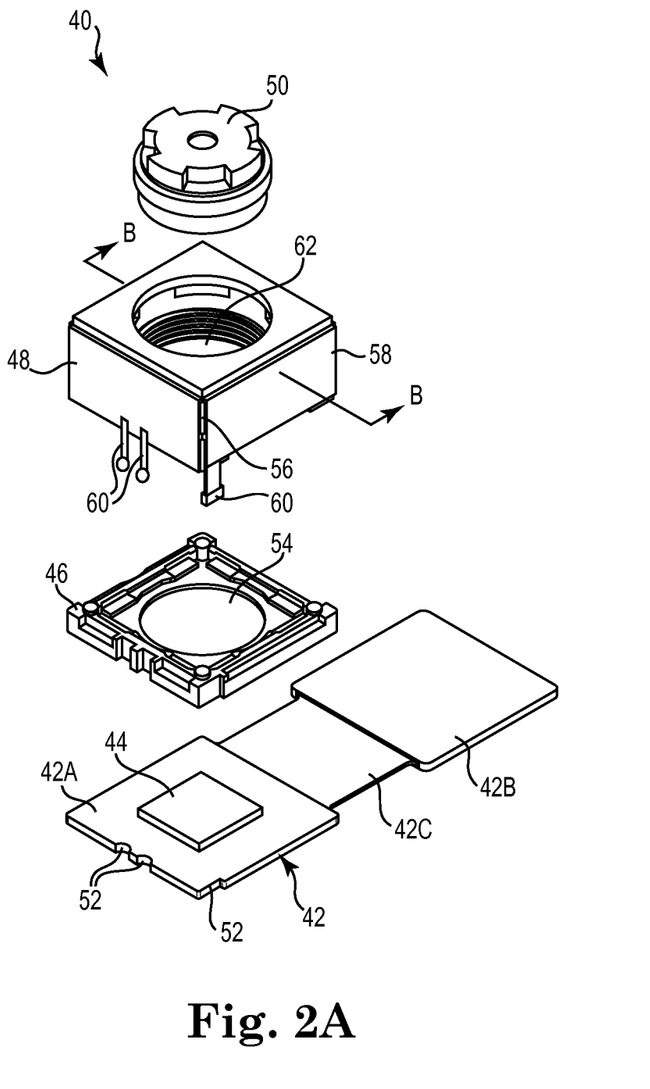
FIG. 2A is an exploded view of the electromechanical component, in a digital camera module embodiment.

FIG. 2A is an exploded view of camera module 40, which is one example of an electromechanically actuated component 12 suitable for use in an electronic device 10, as shown in FIG. 1. In this configuration, camera module 40 includes a circuit board for controller electronics 42, with image sensor 44, mounting base or bracket 46, and a voice coil motor or other electromechanical actuator 48 for positioning lens assembly or carrier 50.

Camera controller 42 is typically provided on a printed circuit board or similar electronic component, for example with first and second portions 42A and 42B coupled via flex circuit 42C. Connections 52 provided power and grounding couplings to actuator 48.

Bracket 46 is mounted on camera controller board 42 to support voice coil motor/actuator 48. Actuator 48 adjusts the position of lens carrier 50 to focus light through aperture 54 onto image sensor 44, in response to actuator control signals from control board 42.

Actuator 48 typically, although not necessarily, includes actuator body 56 with casing 58 and leads 60 for power and grounding connections to connectors 52 on controller board 42. Casing 58 may be formed of a conductor to improve control performance by shielding actuator 48 from stray electromagnetic fields.

Figure 2B:
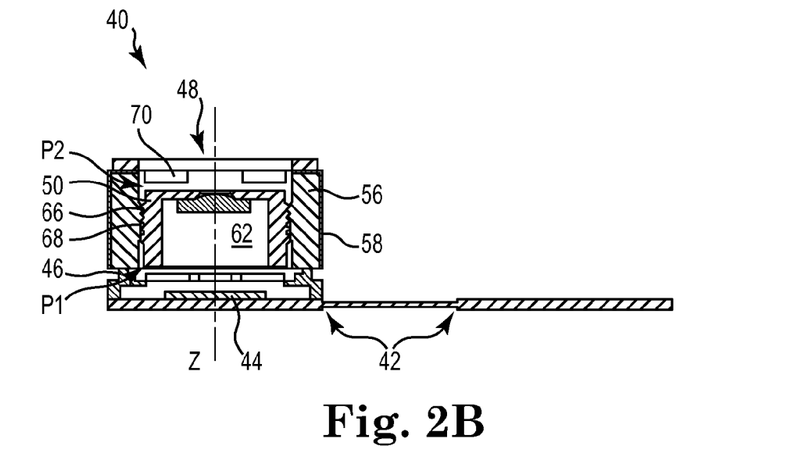
FIG. 2B is a cross-sectional schematic view of the digital camera module.

FIG. 2B is a cross-sectional view of voice coil actuated digital camera module 40, taken along line B-B of FIG. 2A, in an assembled form with actuator body 56 mounted in base 46 and lens carrier 50 positioned in passage 62 to focus camera 40. Voice coil motor or actuator 48 adjusts the position of lens carrier 50 along axis Z, focusing light onto image sensor 44 in response to signals from camera control board 42.

More generally, some mobile devices may include a range of camera modules and other electromechanical components 40 with voice coil motors and similar actuators 48 to position different mechanical components. In camera embodiments, for example, lens carrier 50 is typically supported by one or more springs 66 or similar bias elements, with a coil or coils 68 formed of wire or other conducting material to create a magnetic field for positioning carrier 50 in opposition to the corresponding fields generated by stationary magnets in base 46 or actuator housing 56.

Springs 66 bias lens carrier 50 against base 46 in a disabled or power-down position, toward the bottom of actuator 48. When coils 68 are energized, lens carrier 50 moves away from base 46 to a focus position. If coils 66 are sufficiently energized, carrier 50 will move until it hits one or more hard stops 70 at the top of actuator 48.

Generally, unpowered position P1 is close to or substantially at the infinity focal point, with lens carrier 50 positioned at approximately the focal length from image sensor 44. Fully powered or actuated position P2 is close to or substantially at the lens macro (minimum focus) point, with lens carrier 50 positioned toward hard stops 70 at the top of actuator 48. Alternatively, the biasing and field configurations may be reversed, with lens carrier 50 located toward the top of actuator 48 (position P2) in the powered off or disabled state, and toward the bottom of actuator 48 (position P1) in the activated or fully powered state.

In either design, if lens carrier 50 is insufficiently biased against base 46 or hard stops 70 in the unpowered state, camera module 40 may rattle when coupled to a mechanical vibration or shock, such as generated by vibration motor control 30, or by shaking or impact. The acceleration threshold for these mechanical coupling effects may be determined in terms of an acceleration threshold ($a_0$) detected by accelerometer 34, for example:

$$a_0 = F_k / M, \qquad [1]$$

where $F_k$ is the pre-loading force on the springs or other biasing element 66, and M is the mass of lens carrier 50 (or other actuated component). Thus, when the acceleration reaches or exceeds threshold $a_0$, there is a risk of motion, rattling, and other mechanical effects.

Figure 2C:
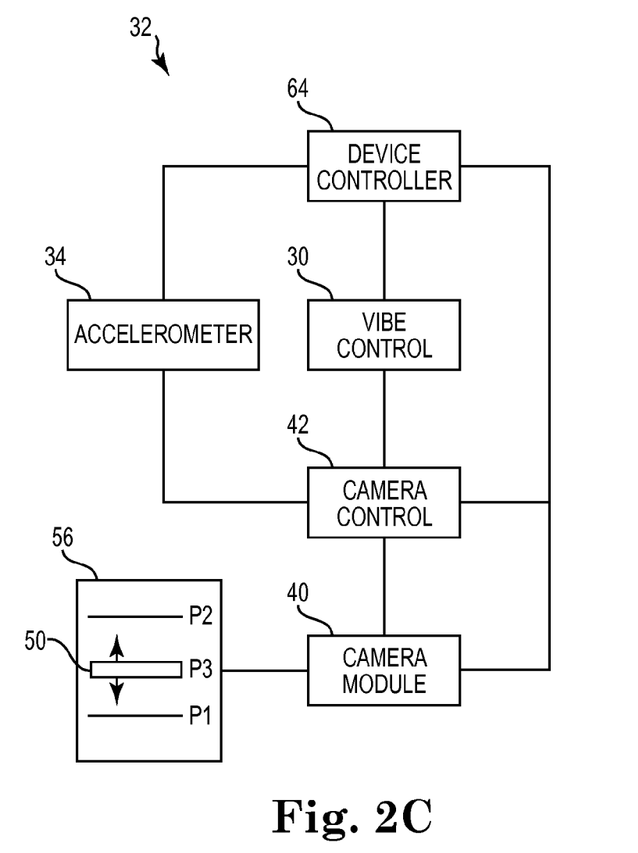
FIG. 2C is a schematic diagram of an actuator control system for the mobile device.

FIG. 3C is a schematic diagram of a sample actuator control system 32, with vibration control 30, accelerometer 34, camera module 40, camera controller 42 and mobile device controller 64. Actuator control system 32 may reduce coupling effects by connecting camera control board 42 to vibration motor control 30 and accelerometer 34, as shown in FIGS. 2A and 2B, or, alternatively, using a separate or remote located control module or device controller 64, in order to provide a safe positioning signal in the event of vibration or shock detection. In particular, system 32 reduces or substantially eliminates rattling by moving lens carrier 50 to a reduced impact or "safe" position P3, between unpowered (disabled) position P1 and fully powered (actuated) position P2. The actuator signals may be selected utilizing mobile device firmware or software on device controller 64, in simultaneous signal communication with vibration motor controller 30, accelerometer 34 and camera controller 42. Alternatively, suitable firmware or software may be provided within camera control board or module 42, in communication vibration motor 30 and accelerometer 34.

The mobile device coupling reduction program comprises software, firmware, hardware or a combination thereof implemented to reduce mechanical coupling effects when vibration or shock events are indicated by signals from one or both of vibe motor control 32 and accelerometer 34, and in other situations when camera 40 (and other electromechanically actuated components) could be subject to rattling and shock or vibration-induced effects. To accomplish this, for example, controller 64 may execute the coupling reduction program to direct control board 42 to apply a selected current or other control signal to actuator 48, in order to move lens carrier 50 (or other mechanical component) to a safe intermediate position between P1 and P2, with reduced risk of contact with base 46, stops 72, or other components of actuator 48, as shown in FIGS. 2A and 2B.

The force applied to lens carrier 50 by a voice coil motor type actuator 48 is roughly linear or proportional to the current in coils 68. For a fixed (e.g., vertical) orientation, the position of carrier 50 is also linearly proportional to the applied coil current. Since gravity also acts on camera module 40, however, the position of actuator 48 may vary, even for fixed current, depending on the rotational orientation of the mobile device and camera module 40.

Figure 3A:
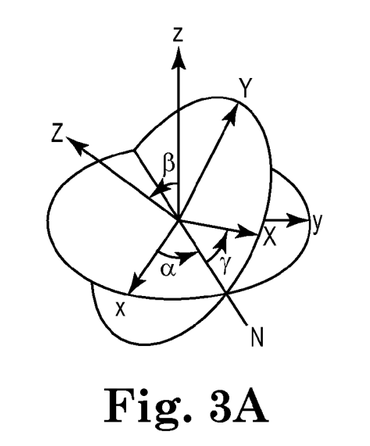
FIG. 3A is a schematic representation of an Euler rotation for the mobile device.

FIG. 3A is a schematic view of an Euler rotation for orienting mobile device 10 of FIG. 1, above. The rotation is defined by Euler angles $\alpha$, $\beta$ and $\gamma$, which define the rotation between a first (original or fixed) coordinate frame (x,y,z), and a second (rotated) coordinate frame (X,Y,Z). In this example, the line of nodes (N) is defined by the intersection of the (x,y) and (X,Y) planes, perpendicular to both the original z axis and the rotated Z axis.

In a standard or classical definition based on extrinsic rotations, first Euler angle $\alpha$ can be defined between the original x axis and the line of nodes (N), corresponding to a rotation about the original z axis, from x toward y. Second Euler angle $\beta$ is defined between the original z axis and the rotated Z axis, corresponding to a rotation about line of nodes (that is, about the intermediate position of the x axis). Third Euler angle $\gamma$ is defined between the line of nodes and the final (rotated) X axis, corresponding to a rotation about the Z axis, in its final position.

Figure 3B:
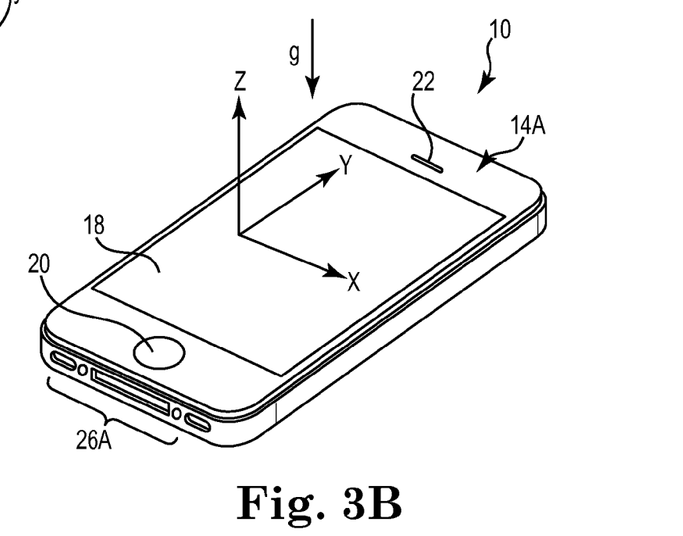
FIG. 3B is a perspective view of the mobile device, before the Euler rotation.

When applied to a physical object such as mobile device 10, as shown in FIG. 3B, the local coordinate axes (X,Y,Z) may be considered fixed with respect to top and bottom surfaces 14A and 14B, thus fixing the relative positions of the other components including user interface 18, speaker 22, audio/control features 26A and 26B, and electromechanical component 12, for example a voice coil actuated camera as described above, or another electromechanically actuated device. Upon rotation of mobile device 10 via the Euler angles to the position of FIG. 3C, however, the orientation of the gravitational field (g) may change, along with other contributions to the net acceleration A, as shown in FIG. 1, above.

In order to achieve the same actuator position with each different orientation of mobile device 10, therefore, the current applied to the coil (or other actuator element) may be increased or decreased according to the relative angular orientation of the actuator axis relative to the gravity vector. This may be determined, for example, by reference to an accelerometer or similar sensing device, as described above. Alternatively, a different mechanical or magnetic field sensor may be utilized to determine orientation, either alone or in combination with the accelerometer.

If the gravity vector points in the original −Y direction, and the mobile device is oriented in space with a rotation described by Euler angles α, β, and γ, then the additional current ΔI necessary to overcome or counterbalance the effect of gravity is:

$$\Delta I = K \times M \times g \, [\sin(\gamma)\sin(\alpha) - \cos(\beta)\cos(\alpha)\cos(\gamma)]. \quad [2A]$$

In this expression, M is the mass of the carrier including the lens and any other elements that move with the lens, or other actuated component, g is the acceleration due to gravity, and K is a constant relating the coil current to the positioning force. The constant K is specific to each actuator design, and may be nonlinear in some cases. That is, while K may typically be substantially constant with coil current I, K may also vary slightly as a function of current I, or K may vary substantially as a function of current I.

If the gravity vector points in the −Z direction, on the other hand, as shown in FIG. 3B, the expression may be simplified to:

$$\Delta I = K \times M \times g [\cos(\beta)]. \quad [2B]$$

Thus, the analysis is adaptable to any particular orientation or state of motion with respect to the gravity vector, or other contribution to the acceleration.

Note that the selection of Euler angle convention is arbitrary, and there are multiple equivalent forms. In terms of the standard x convention as compared to other formulations, for example, the Euler angles and rotations may be specified in different orders or directions, or about different axes, and in either active or passive form. Also, the values may be defined in terms of different variables ϕ, θ and ψ. In addition, the effect may be based on the net acceleration (A), rather than only the gravitational field; for example:

$$\Delta I = K \times M \times A[\sin(\psi)\sin(\phi) - \cos(\theta)\cos(\phi)\cos(\psi)]. \quad [3]$$

Alternatively, the expression may take other forms, depending on orientation of the device and the corresponding values of the angles, and the variables and conventions used to define them.

In addition, the gravity and acceleration vectors may also be defined along the +Y axis, or along the ±X axis or the ±Z axis, without loss of generality. In this case there are corresponding modifications to Equations 2 and 3, as described by FIGS. 3A-3C, and as known in the art of three dimensional rotations.

Figure 4:
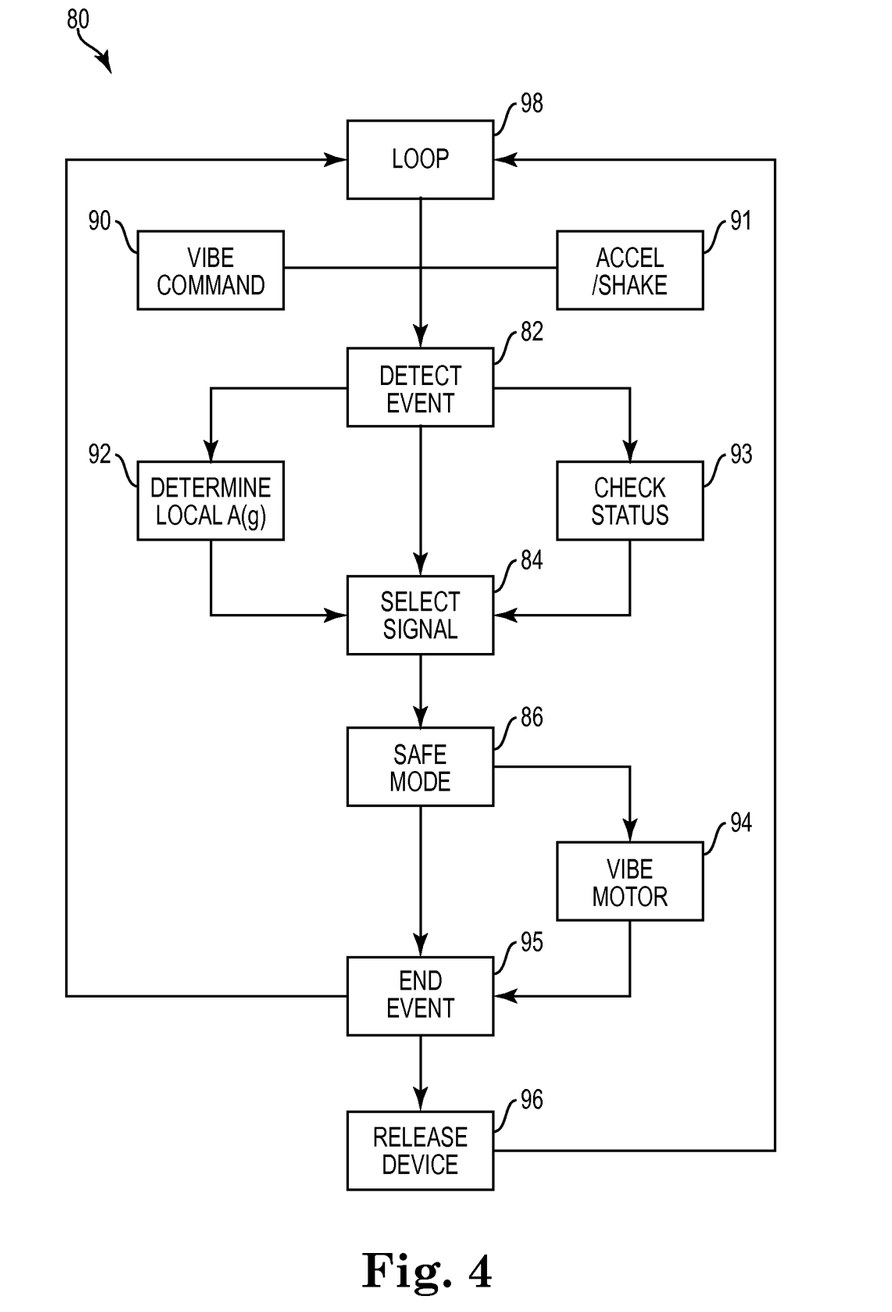
FIG. 4 is a block diagram illustrating a method for reducing mechanical coupling in a mobile device.

FIG. 4 is a block diagram of a method 80 for reducing mechanical coupling in a mobile device. Method 80 comprises one or more steps of detecting a mechanical event (step 82), selecting an actuator signal (step 84) to reduce mechanical coupling effects, and actuating a device (step 86) with the selected signal. The steps may be performed in any order, alone or together, and in any order or combination with additional steps including, but not limited to: sending or receiving a vibration command (step 90), detecting an acceleration or shock (step 91), determining a local net acceleration (A) or gravitational acceleration (g) (step 92), checking the operational status (step 93) of an electromechanical device such as a camera, inducing a mechanical vibration (step 94), ending or detecting the end of the mechanical event (step 95), releasing or de-actuating the device (step 96), calibrating (step 97) and looping back (step 98) to detect additional mechanical events (step 82).

Figure 3C:
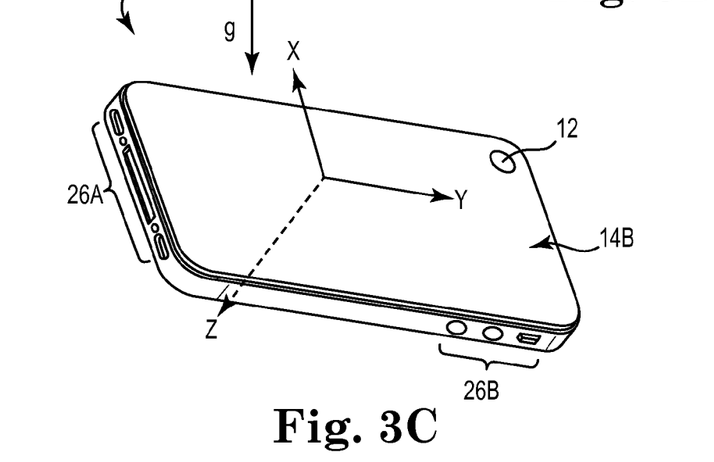
FIG. 3C is a perspective view of the mobile device, after the Euler rotation.

Method 80 may be performed by a mobile device, as shown in FIGS. 1, 3B and 3C, above, or by a mechanical coupling reduction system operating on such a device, as shown in FIG. 2B. In particular, method 80 may be utilized to reduce mechanical coupling effects for an electromechanical component on the mobile device, for example a digital camera module with a voice coil actuator, or any electromechanical device with an actuator to position one or more mechanical components. Method 80 may also be performed utilizing a mobile device processor operating software or firmware code, or a combination of mobile and server or cloud components. Further, method 80 may be implemented by storing code on a non-volatile machine-readable medium, and executing the code on a processor or other computer hardware.

Step 82 (detect event) comprises sensing or otherwise determining an ongoing or incipient mechanical event, such as a vibration, acceleration or shock. Detecting the event may include receiving or generating a vibration command (step 90), or both, for example as executed in two separate steps 90, for a vibration motor or other haptic signal generator, or sensing an acceleration, shake or shock (step 91) based on an accelerometer or other mechanical sensor. In addition, one or both of steps 90 and 91 may also include "pre-bracing" for an upcoming event, for example pre-bracing for an impact predicted as the result of a detected free fall condition, or pre-bracing based on a known upcoming alarm signal, for example a calendar reminder or wake up alarm.

Step 90 (vibration detection) may include event detection based on either or both internal and external (incoming or received) commands, for example an incoming call signal, or an email or text communication command received over a wireless link. Internal (or internally generated) event signals and commands include alarms and calendar reminders, and command signals from other mobile device applications such as games, multimedia presentations, and navigational applications.

Step 91 (shake, shock or acceleration detection) encompasses a range of signal recognition techniques performed on signals generated by accelerometers, gyroscopes, magnetic field sensors and/or other mechanical or electromagnetic sensors, indicating a change in state of motion in the mobile device. Vibration signals include may be induced, for example, by shaking or audio feedback, and may be generated by the mobile device itself, for example via a high-level speaker command, or from an outside source, such as a user or external speaker or vibration-inducing element.

Shock and vibration events may be indicated by acceleration signals over a particular absolute threshold, for acceleration threshold $a_0$ based on a spring bias force as described above with respect to Equation 1. Alternatively, the threshold may be determined in terms of local acceleration g, for example by an acceleration substantially above g, e.g., 2 g or more, 3-5 g, 5 g or more, or 10 g or more. Alternatively, a free fall indicator may be used, for example a sustained local weightlessness or gravitational acceleration vector with a magnitude substantially below g, for example half g or less. In each of these examples, temporal thresholds or time windows may also be utilized, based on the duration of a particular signal, as described below.

Step 91 (vibration detection) also encompasses vibration effects indicated by a change of sign in acceleration within a particular frequency range, for example a mechanical range of 0 Hz to about 40 Hz or about 100 Hz, or an audio range from about 40 Hz or about 100 Hz to about 1,000 Hz, about 10,000 Hz or about 20,000 Hz. Vibration, shock, and acceleration signals are also characterized by a particular time window or integration time, for example a signal duration of greater than about a tenth of a second, greater than about two tenths of a second, or greater than about a half a second or more, for example greater than about one second.

Step 92 (determining local acceleration) is also typically performed with the accelerometer or similar mechanical sensor, but other devices such as electromagnetic and optical sensors may be used. For substantially constant motion, the net local acceleration (A) may be determined according to the local direction of the gravitational field vector (g). Alternatively, mobile devices may be exposed to a combination of gravitational effects and other accelerations, for example inside a vehicle, or walking, running, biking, or by falling. Thus, depending on application, the acceleration measurement may either be defined in terms of gravitational acceleration g, or in terms of net acceleration A, based on a combination of gravitational acceleration g and motion of the mobile device.

In falling applications, local rotations of the mobile device may also contribute to the acceleration measurement. Depending on application, these can be decoupled to determine a value for the net local acceleration vector. In a falling event, this net value may be of relatively small magnitude (e.g., substantially less than g, or substantially free fall), which may indicate an incipient shock event or impact. Alternatively, a combination of rotational and other mechanical motions may indicate a vibration or shaking event (step 91).

Step 93 (checking device status) determines whether the camera or other electromechanical component is being actively controlled or actuated. For example, in cases where a camera or other imaging device is actively focusing, method 80 may be utilized to cancel a vibration command (step 90), or to generate an alternate visual signal or alarm instead. Where the camera is in active use, for example, a visual alarm may be generated on the same graphical interface used for the camera, increasing the user recognition rate. Alternatively, for example where a shock event is indicated, method 80 may be utilized to override the active command and place the device in a safe mode or reduced mechanical coupling position, without regard to camera focusing or other actuation control signals, as described below.

Step 84 (signal selection) determines the coil current or other actuator signal required to position the lens carrier (or other mechanical component) in a safe position with reduced rattling and other mechanical coupling effects. Typically, the safe position is selected between an unpowered or de-activated position and a fully actuated position, for example within a mid range determined by a digital actuator signal range. In an eight-bit device, for example, the safe position may be defined around position 127 or 128, as defined with respect to a linear actuator position scale on a 256-bit binary scale, or in a corresponding mid position range between about 64 or about 96 and about 160 or about 192. In a twelve-bit or sixteen-bit devices, the safe range may vary about midpoints of around 2 k and around 32 k, respectively, corresponding to the physical position of the lens carrier or other actuated element, as located between power-off and fully actuated positions, based on the digitally selected current supplied to the voice coil motor or other actuator device.

Step 86 (actuate device to safe mode) includes sending the actuator signal to the actuator, in order to position the lens carrier or other mechanical component in the safe position during all or part of the vibration, shock or acceleration event. In some applications, a generic mid positional range is selected, as described above, and in other applications the signal is also selected based on a local acceleration or gravitational field measurement (step 92), for example as described with respect to Equations 2 and 3.

Calibration may also be used to further refine signal selection (step 84) and safe positioning (step 84). In the calibration process, which could be performed separately from method 80, representative models of the mobile device may be tested in an acoustic chamber, vibration rig or other experimental apparatus, in order to measure mechanical coupling signals such as rattle. The position of the lens carrier or other actuated component is then varied to determine the signal as a function of actuator position, with the safe position (or safe range of positions) defined by the region of reduced mechanical coupling signal. In some applications, representative mobile devices for calibration are based on camera model or other characteristics of the electromechanical actuator, and in other applications each individual mobile device is individually calibrated, for example as part of a vibration test for individual unit quality control.

Step 94 (operate vibration motor) may be utilized to generate a haptic signal with a vibration motor or other device, typically after the lens carrier or other mechanical component has been actuated to its safe position (step 86). Alternatively, when the actuator is in active use (step 93), the vibration signal may be omitted altogether in favor of a visual alarm, as described above. In further applications, the actuator may be forced into safe mode by overriding the control signal in step 86, regardless of status, for example in the case of an incipient shock event or urgent communication signal. In these applications, forcing the actuator into safe mode could typically occur as a pre-bracing function in response to a known incoming or predicted alert or vibration event. Forced override might not occur, for example, in response to a drop event.

Step 95 (end event) encompasses both passive (detected) and active (internally generated) event ends. Passive mechanical event end detection includes detection of a sustained below-threshold acceleration, shock, or shake signal (step 91), for example as characterized by a low signal magnitude or monotonic, relatively constant signal over a particular time window.

Active event ends include termination of a vibration control signal (step 94), for example based on the termination of an incoming call or message signal, or the termination of a game or other application-based vibration event. Alternatively, the event end may be indicated at the close of a multimedia presentation that utilized a vibration signal, or by a reduction in generated noise volume where an audio output signal drops below the threshold where mechanical coupling to the camera or other actuated device is an issue.

Step 96 (release or de-actuating) includes returning the actuator to an initial state, before the mechanical event, for example a de-activated or powered-down state, or to an actively controlled state that was interrupted by a safe mode override in step 86. Alternatively, for some events such as strong shocks or an emergency signals, the device may remain in safe mode until another event is detected, for example a power down or end of alarm condition.

Step 98 (loop) allows method 80 to be performed iteratively, looping back to detect additional events (step 82). In some designs, status information obtained in previous iterations is preserved, for example a vibe command (step 90), acceleration or shock signal (step 91), event detection (step 82), acceleration measurement (step 92), status check (step 93), signal selection (step 84), safe mode actuation or override (step 86), vibe motor operation (step 94), end event flag (step 95) or release device signal (step 96). Alternatively, one or more settings may be reset, allowing method 80 to perform in either a single-event (independent series) or cumulative (sequencing event) mode. More generally, the steps of method 80 may also be performed substantially simultaneously, using command interrupts and similar process management techniques to provide for continuous monitoring and event handling.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

The invention claimed is:

1. A personal digital device comprising:
   an electromechanical module comprising an actuator for positioning a mechanical element between first and second positions; and
   a controller coupled to the electromechanical module, the controller configured to:
      detect a mechanical event coupling to the electromechanical module;
      select an actuator signal to position the mechanical element in a safe position between the first and second positions wherein the mechanical element is less vulnerable to at least one mechanical effect related to the mechanical event in the safe position than in the first and second positions; and
      transmit the selected signal to the electromechanical module, wherein the mechanical element is positioned in the safe position during the event.

2. The personal digital device of claim 1, further comprising a vibration motor coupled to the controller for generating the mechanical event as a vibration.

3. The personal digital device of claim 2, wherein the electromechanical module comprises a camera having a voice coil actuator for positioning a mechanical lens carrier element between a first infinity focus position and a second macro focus position.

4. The personal digital device of claim 3, wherein the controller is configured to transmit the selected actuator signal to position the lens carrier element between the infinity focus position and the macro focus position during the vibration.

5. The personal digital device of claim 1, further comprising an accelerometer coupled to the controller for detecting the mechanical event based on acceleration.

6. The personal digital device of claim 5, wherein the controller is configured to detect the mechanical event based on acceleration over a threshold determined by a mass of the mechanical element and a biasing force on the mechanical element.

7. The personal digital device of claim 5, wherein the controller is configured to detect the mechanical event based on acceleration indicative of free fall of the personal digital device.

8. The personal digital device of claim 5, wherein the controller is configured to select the actuator signal based on a direction of the acceleration with respect to an axis of the actuator.

9. A mobile phone comprising the personal digital device of claim 1, wherein the electromechanical module comprises a voice coil actuator for positioning a mechanical lens carrier element between first and second focus positions.

10. The mobile phone of claim 9, further comprising a vibration motor for generating the mechanical event as a vibration signal, wherein the controller is further configured to generate a visual signal in lieu of the vibration signal when the actuator is active.

11. A method for reducing mechanical coupling effects in a portable electronic device having a camera module, the method comprising:
    detecting a mechanical event coupling to a lens carrier of the camera module, the camera module having an actuator for positioning the lens carrier between first and second focus positions;
    selecting an actuator signal to position the lens carrier in a safe position between the first and second focus positions wherein the lens carrier is less vulnerable to at least one mechanical effect related to the mechanical event in the safe position than in the first and second focus positions;
    transmitting the selected actuator signal to the camera module; and
    positioning the lens carrier in the safe position to reduce the mechanical coupling effects during the event.

12. The method of claim 11, further comprising generating the event by operation of a vibration motor in the portable electronic device.

13. The method of claim 11, further comprising generating the event by operation of an audio speaker in the portable electronic device.

14. The method of claim 11, further comprising detecting the mechanical event based on an acceleration signal from an accelerometer in the portable electronic device.

15. The method of claim 14, wherein the acceleration signal exceeds a threshold based on a spring bias force acting on the lens carrier in an unpowered state.

16. The method of claim 11, further comprising calibrating the portable electronic device to select the actuator signal based on a minimum range of a mechanical coupling signal observed during vibrations.

17. A mobile device comprising:
    a vibration motor for generating vibration signals;
    a camera module having a voice coil actuator for positioning a lens carrier between first and second focus positions; and
    a controller coupled to the vibration motor and the camera module, the controller configured to select an actuator signal for positioning the lens carrier in a safe position between the first and second focus positions wherein the lens carrier is less vulnerable to at least one mechanical coupling effect in the safe position than in the first and second focus positions, such that mechanical coupling effects are reduced during operation of the vibration motor.

18. The mobile device of claim 17, further comprising an accelerometer coupled to the controller to sense acceleration of the mobile device.

19. The mobile device of claim 18, wherein the controller is configured to select the actuator signal to position the lens carrier in the safe position based on the acceleration being over a threshold determined by a spring bias force on the lens carrier.

20. The mobile device of claim 18, wherein the controller is configured to select the actuator signal to position the lens carrier in the safe position based on a direction of the acceleration with respect to an axis of the voice coil actuator.

* * * * *